(12) United States Patent
Luo et al.

(10) Patent No.: US 10,024,745 B1
(45) Date of Patent: Jul. 17, 2018

(54) DYNAMOMETER FOR AUTOMOBILE STEERING WHEEL POSITION ADJUSTING DEVICE

(71) Applicant: Rong Luo, Jiangsu (CN)

(72) Inventors: Rong Luo, Suzhou (CN); Hui Lu, Suzhou (CN); Baolin Zhao, Suzhou (CN)

(73) Assignee: XIONG HUA MACHINERY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 15/118,439

(22) PCT Filed: Jul. 14, 2015

(86) PCT No.: PCT/CN2015/083934
§ 371 (c)(1),
(2) Date: Aug. 11, 2016

(87) PCT Pub. No.: WO2016/197431
PCT Pub. Date: Dec. 15, 2016

(30) Foreign Application Priority Data

Jun. 12, 2015 (CN) .......................... 2015 1 0323933

(51) Int. Cl.
*G01L 5/22* (2006.01)
*G01L 25/00* (2006.01)
(Continued)

(52) U.S. Cl.
CPC .............. *G01L 5/26* (2013.01); *G01L 3/1485* (2013.01); *G01M 17/007* (2013.01);
(Continued)

(58) Field of Classification Search
CPC ........................ G01L 5/0066; B60W 2710/202
See application file for complete search history.

(56) References Cited

U.S. PATENT DOCUMENTS 5,700,951 A * 12/1997 Sagiyama ............. G01M 17/06
73/11.04
2007/0089534 A1* 4/2007 Chang ................. G01M 13/025
73/862.08

FOREIGN PATENT DOCUMENTS

CN 201359565 Y * 12/2009
JP 2000019088 A * 1/2000

OTHER PUBLICATIONS

Title:"International Search Report"; dated Dec. 15, 2016.*
Title:"English Translation of the Written Opinion of the International Search Authority"; dated Jan. 25, 2017.*

* cited by examiner

*Primary Examiner* — Leslie J Evanisko
*Assistant Examiner* — Ruben Parco, Jr.
(74) *Attorney, Agent, or Firm* — Jackson IPG PLLC; Demian K. Jackson

(57) ABSTRACT

A dynamometer for automobile steering wheel position adjusting device which comprising: a rack box, a fixing fixture, a supplemental fixing fixture, a first dynamometer mechanism, and a second dynamometer mechanism. The fixing fixture which comprising a base panel, four locking devices, two supporting device; the two dynamometer mechanism are both provided with a dynamometer. The fixing fixture and the first dynamometer mechanism are mounted on the base surface of the rack box, the first dynamometer mechanism is arranged in front of the fixing fixture, the supplemental fixing fixture is mounted on the right side wall of the rack box and the second dynamometer mechanism is mounted on the left side wall of the rack box. The two dynamometer mechanisms test the force required to turn adjustment handle or to pull or push the telescoping column with the neck of the steering wheel position adjusting device respectively.

8 Claims, 14 Drawing Sheets

(51) Int. Cl.
  *G01L 5/26* (2006.01)
  *G01L 3/14* (2006.01)
  *G01M 17/007* (2006.01)
  *B62D 1/181* (2006.01)
  *B62D 1/187* (2006.01)
(52) U.S. Cl.
  CPC ....... *B60W 2710/202* (2013.01); *B62D 1/181* (2013.01); *B62D 1/187* (2013.01)

DYNAMOMETER FOR AUTOMOBILE STEERING WHEEL POSITION ADJUSTING DEVICE

FIELD OF THE INVENTION

Present invention relates to an equipment for testing automobile steering wheel position adjusting device, more particular, a dynamometer for testing action force of the adjustment handle and telescoping column (connects to the steering wheel) in a steering wheel position adjusting device.

BACKGROUND OF THE INVENTION

Generally known, automobile steering wheels provide a position adjusting device, as shown in FIG. 1, an Japanese auto maker Nissan uses a kind of steering wheel position adjusting device a, the device which comprising a main body a1, a neck a2, an adjustment handle a3 and a telescoping column a4; wherein, the adjustment handle a3 connects to the main body a1; and the telescoping column connects to the steering wheel. When adjusting the steering wheel, a user needs to turn the adjustment handle then to lift or press down on the steering wheel, this action is a process of extending or depressing the telescoping column in the neck. In order to allow easy operation of adjusting steering wheel position, the tightness of the combination of the adjustment handle and the steering wheel position adjusting device should be just right, as well as the tightness of the telescoping column when extending or depressing should also be appropriate to allow both men and women user (different in arm strength) to easy adjusting of the steering wheel.

According to the prior art, before leaving the factory, the factory will have to test and adjust the adjustment handle and telescoping column for appropriate dynamism, during the testing and adjusting, the steering wheel adjusting device needs to be securely fixed.

SUMMARY OF THE INVENTION

The objective of the present invention is to provide a dynamometer for automobile steering wheel position adjusting device in Japanese auto brand Nissan automobiles. The goal is to provide a securing mean for the steering wheel position adjusting device in order to test the required force to turn the adjustment handle and the tightness of the telescoping column within the neck of the steering wheel adjusting device so that the manufacturer can make appropriate adjustment of the steering wheel position adjusting device before leaving the factory.

In order to achieve the above objective the present invention provides a dynamometer for automobile steering wheel position adjusting device which comprising: a rack box, a fixing fixture, a supplemental fixing fixture, a first dynamometer mechanism, and a second dynamometer mechanism; wherein, the rack box which comprising a chassis and a box body, and the box body is mounted on top of the chassis; wherein, the fixing fixture which comprising a base panel, a first locking device, a second locking device, a third locking device, a fourth locking device, a first supporting device and a second supporting device; wherein, the supplemental fixing fixture which comprising a levelly arranged linear cylinder and a positioning assembly mounted on the linear cylinder; wherein, the first dynamometer mechanism which comprising a longitudinal rail, a dynamometer and a positioning device; wherein, the second dynamometer mechanism which comprising a chassis apical plate, a longitudinal flat panel, a first transverse flat panel, a second transverse flat panel, a handle dynamometer device and a handle tuning device; wherein, it is characterized that: the first locking device, the second locking device, the third locking device and the fourth locking device are mounted on the base panel, the first locking device, the second locking device, the third locking device and the fourth locking device which all comprising a linear lifting cylinder, a fixing plate, a locking piece, a supporting piece and a supporting platform; the linear lifting cylinder is mounted on the fixing plate and the fixing plate is levelly arranged, the fixing piece is vertically mounted on the fixing plate, the locking piece is in a T shape, the T shaped locking piece which comprising a rear branch, a middle branch and a front branch, the rear branch is hinged to a piston rod of the linear lifting cylinder, the middle branch is hinged to the tip of the supporting piece, and the supporting platform is mounted on the base panel and below the front branch; wherein, the first supporting deice which comprising a first lifting cylinder and a supporting plate, the first lifting cylinder is mounted on the base panel, the first supporting plate is mounted on a piston rod of the first lifting cylinder, and the supporting plate is levelly arranged; wherein, the second supporting device which comprising a second lifting cylinder and a supporting piece, the second lifting cylinder is mounted on the base panel and the supporting piece is mounted a piston rod of the second lifting cylinder; wherein, the base panel is in a convex shape, the convex shaped base panel which comprising a small rectangular panel and a large rectangular panel; the first supporting device and the second supporting device are mounted on the small rectangular panel, the first supporting device is arranged directly in front of the second supporting device; the first locking device and the second locking device are respectively and symmetrically arranged at left and right side of the large rectangular panel, the front branch of the locking piece in the first locking device and the front branch of the locking piece in the second locking device are arranged opposite to each other; the third locking device and the fourth locking device are respectively arranged at the left and right side of the large rectangular panel, behind the first and the second locking device, the locking piece in the third and the fourth locking device are perpendicular to each other; wherein, the dynamometer which comprising a first sliding panel, a first supporting frame, a transverse rail, a transverse driving element, a first longitudinal driving element, a gripper and a pressure sensor; the first sliding panel is slidably mounted on the longitudinal rail, the first longitudinal element drives the first sliding panel to slide on the longitudinal rail, the transverse rail is mounted on the first sliding panel, the first supporting frame is slidably mounted on the transverse rail, the transverse driving element drives the first supporting frame to slide on the transverse rail, the gripper is mounted on the first supporting frame and the pressure sensor is embedded in between the gripper and the first supporting frame; wherein, the positioning device which comprising a second sliding panel, a second supporting frame, a transverse cylinder, a second longitudinal driving element, and a positioning head; the second sliding panel is slidably mounted on the longitudinal rail, the second longitudinal driving element drives the second sliding panel to slide on the longitudinal rail, the second supporting frame is fix mounted on the second sliding panel, the transverse cylinder is fix mounted on the second supporting frame and the positioning head is mounted on a piston head of the transverse cylinder; wherein, the dynamometer and the positioning device are slidably mounted on two sides of the longitudinal rail; the gripper in the dynamometer and the positioning head in the positioning device are arranged at a same side of the longitudinal rail; wherein, the chassis apical plate is levelly arranged in a fixed position; the longitudinal flat panel is slidably mounted on bottom plane of the chassis apical plate, the longitudinal flat panel is able to move in longitudinal direction in relation to the chassis apical plate; the first transverse flat panel and the second transverse flat panel are slidably mounted on the bottom plane of the longitudinal flat panel, the first transverse flat panel and the second transverse flat panel are arrange in juxtapose but independent to each other, the first transverse flat panel is able to move in transverse direction in relation to the longitudinal flat panel, and the second transverse flat panel is able to move in transverse direction in relation to the longitudinal flat panel; the handle dynamometer device is mounted on the bottom plane of the first transverse flat panel, and the handle tuning device is mounted on the bottom plane of the second transverse flat panel; wherein, the handle dynamometer which comprising a third supporting frame, handle gripping adjustment device, a rotary shaft, a torque sensor, a transmission device and a servo motor; the third supporting frame is fix mounted on the first transverse flat panel, the rotary shaft is hinged to the third supporting frame, the handle gripping adjustment deice is fix mounted on one end of the rotary shaft, the other end of the rotary shaft is connected to the servo motor through the transmission device, the torque sensor is mounted on the rotary shaft; and the axis of the rotary shaft is arranged transversely; wherein, the handle tuning device which comprising a fourth supporting frame, a sleeve and a servo tightening axis; the fourth supporting frame is fix mounted on the second transverse flat panel, the sleeve is hinged to the fourth supporting frame, the back end of the sleeve is hinged to the servo tightening axis; and the sleeve is arranged transversely; and wherein, the fixing fixture and the first dynamometer mechanism are mounted on the base of the box body, the first dynamometer is located in front of the fixing fixture, the supplementary fixing fixture is mounted on the right inner side wall of the box body, and the second dynamometer mechanism is mounted on the left inner side wall of the box body.

According to the above described technical solutions, the operating principle of the present invention of the dynamometer for automobile steering wheel position adjusting device is as following:

First, before testing the steering wheel position adjusting device, the steering wheel position adjusting device a is placed on the fixing fixture, more specifically, the steering wheel position adjusting device is placed on the four locking devices of the supporting platform, the supporting panel of the first supporting device, and the supporting piece of the second supporting device; wherein, the four locking devices of the supporting platform support the main body of the steering wheel position adjusting device, and the supporting panel and the supporting piece support the neck of the steering wheel position adjusting device.

Second, the linear lifting cylinder in the four locking devices extends, the linear lifting cylinder lifts the rear branch of the locking piece, the locking piece pivots around the middle branch and turns in a certain degree of angle with the hinge joint of the supporting piece, the front branch of the locking piece presses down on the portion of the steering wheel position adjusting device that rests on the supporting platform; and at this time, the main body of the steering wheel position adjusting device is secured.

Third, the linear cylinder in the supplementary fixing fixture extends and drives the positioning assembly to push against the side wall of the main body of the steering wheel position adjusting device a to further secure the steering wheel position adjusting device.

Fourth, the second lifting cylinder in the second supporting device extends and drives the supporting piece to move upward and push against the bottom of the neck of the steering wheel position adjusting device to further secure the steering wheel position adjusting device.

Fifth, in the second dynamometer mechanism, the rotating centerline of the adjusting handle is parallel to the axis of the rotary shaft in the handle dynamometer device. The longitudinal flat panel moves in a longitudinal direct in relation to the chassis apical plate, the longitudinal flat panel drives the handle dynamometer device to move longitudinally, which moves the gripping adjustment device to the side of the adjustment handle, afterward, the first transverse flat panel moves transversely in relation to the longitudinal flat panel, the first transverse flat panel drives the handle dynamometer device to move transversely, which causes the gripping adjustment device in the handle dynamometer device to grip on the adjustment handle in the steering wheel position adjusting device, the servo motor through the transmission device to turn the rotary shaft, the rotary shaft drives the gripping adjustment device to turn the adjustment handle, during the turning of the adjustment handle, and the torque sensor mounted on the rotary shaft senses the required torque to turn the adjustment handle. If the torque required to turn the adjustment handle does not match the predetermined value, then the adjustment handle is released from the gripping adjustment device, and after the longitudinal flat panel is moved longitudinally above the chassis apical plate and the second transverse flat panel is moved transversely above the longitudinal flat panel, the sleeve in the handle tuning device sleeves the adjusting bolt, the servo tightening axis drives the sleeve to turn clockwise or counter clockwise in a certain angle to adjust the tightness of the adjusting bolt and to adjust the torque required to turn the adjustment handle. Afterward, the sleeve is released from the adjusting bolt, the longitudinal flat panel is moved longitudinally above the chassis apical plate and the first transverse flat panel is moved transversely above the longitudinal flat panel, the gripping adjustment device in the handle dynamometer device again, gripping on the adjustment handle and testing the torque figure, if the torque figure still not matching the predetermined value, the sleeve in the handle tuning device again, adjusting the tightness of the adjusting bolt on the adjustment handle.

Sixth, in the first dynamometer mechanism, the second longitudinal driving element drives the second supporting frame in the positioning device to move on the longitudinal track to a predetermined working station, afterward, the transverse cylinder drives the positioning head to move transversely in a predetermined distance, the positioning head pushes against the top of the telescoping column causing the telescoping column to retract a certain distance within the neck to allow the griper to precisely grip the top of the telescoping column during operation; afterward, the transverse cylinder and the second longitudinal driving element drive the positioning head to return to the original position; afterward, the first longitudinal driving element drives the first supporting frame in the dynamometer to move on the longitudinal track to near the top of the telescoping column, the transverse driving element drives the first supporting frame to move transversely, and causing the griper to move and grip the top of the telescoping column. Afterward, driving by the transverse driving element, the griper to pull or push the telescoping column, the griper sends the pull or push pressure to the pressure sensor in the dynamometer, and the pressure sensor shows the reading in a display, as such the operator is able to know the required force to pull or push the telescoping column within the neck and to make appropriate adjustment.

In the above described technical solution, in the fixing fixture, the first locking device, the second locking device, the third locking device and the fourth locking device, before securing the steering wheel positioning adjusting device, the first lifting cylinder in the first supporting deice drives the supporting panel to precisely position the steering wheel position adjusting device.

As a further description of the four locking devices in the fixing fixture, the rear branch of the locking piece is hinged to the piston rod of the linear lifting cylinder by the lifting piece, the base of the lifting piece is fix mounted on the piston rod of the linear lifting cylinder, the top portion of the lifting piece is provided with a sliding slot, a sliding rod is interposed in the sliding slot, and the sliding rod is hinged to the rear branch of the locking piece.

As a further description of the first supporting deice in the fixing fixture, the first supporting deice which further comprising a stroke readable cylinder, the stroke readable cylinder is mounted on a vertical plate, the vertical plate is fix mounted on a small rectangular panel of the base panel, a piston rod of the stroke readable cylinder is connected with the supporting plate by a floating connecting head, and the piston rod of the stroke readable cylinder and the piston rod of the first lifting cylinder are respective connected to the left and right side of the supporting plate.

As a further description of the supplementary fixing fixture, the positioning assembly which comprising a connecting piece, a moving piece, a positioning push head and a threaded fastening piece; the connecting piece is fix mounted on a piston rod of the linear cylinder, the moving piece is mounted on the connecting piece through the threaded fastening piece, the threaded fastening piece is provided with a rotating handle, the positioning head is fix mounted on the moving piece; the positioning push head is in cylindrical shape, the connecting piece and moving piece are in plate-like shape, the positioning push head and the moving piece are perpendicular to each other, and the positioning push head and the connecting are perpendicular to each other.

As a further description of the first dynamometer mechanism and positioning device, the first supporting frame is provided with a first stopper bolt, near the outer side of the longitudinal rail is provided with a first stopper piece which couples with the first stopper bolt, the first stopper bolt is provided with a first cushioning piece; the second supporting frame is provided with a second stopper bolt, the inner side of the longitudinal rail is provided with a second stopper piece which couples with the second stopper bolt, and the second stopper piece is provided with a second cushioning piece;

As a further description of the first dynamometer mechanism and positioning device, the transverse driving element is an electrical cylinder, the transverse driving element is fix mounted on the first sliding panel, a piston rod of the transverse driving element is fix connected with the first supporting frame; the first longitudinal driving element is an electrical cylinder, the first longitudinal driving element is fix mounted on the outer side of the longitudinal rail, the sliding piece of the first longitudinal driving element is fix connected with the first sliding panel; the second longitudinal driving element is an air cylinder, the second longitudinal driving element is mounted on the inner side of the longitudinal rail, and a piston rod of the second longitudinal driving element is fix connected with the second sliding panel.

As a further description of the gripping adjustment device in the second dynamometer mechanism, the handle gripping adjustment device which comprising a first connecting panel, a second connecting panel, a fixing bolt, an adjusting bolt, a fixing piece, a first set cylindrical handles and a second set cylindrical handles; the first connecting panel is fix mounted on the rotary shaft, the second connecting panel is provided with a long through hole, the fixing bolt is interposed in the long through hole and bolted to the first connecting panel, the first connecting panel is provided with a slot, the fixing piece is fixed in the slot, the adjusting bolt is hinged to the fixing piece, the threaded portion of the adjusting bolt is bolted to the end surface of the second connecting panel, the length of the adjusting bolt equals to the length of the long through hole; the first set cylindrical handles and the second set cylindrical handles both which comprising a pair of parallel cylindrical handles, the first set cylindrical handles and the second set cylindrical handles are vertically fix mounted on the second connecting panel where the first set cylindrical handles is arranged in front of the second set cylinder handles on the second connecting panel, the centerline of any cylindrical handle of the first or second set cylindrical handles is perpendicular to the axis of the rotary shaft.

As an improvement of the present invention, the parts transporting mechanism is mounted on the rear side wall of the box body, the parts transporting mechanism is located above of the fixing fixture; the parts transporting mechanism which comprising a roller conveyor track and a parts box, the roller conveyor track runs through the rear side wall of the box body and tilts toward the box body, one end of the roller conveyor track, inside the box body, is provided with a limiting rod, and the parts box slides on the roller conveyor track.

DETAILED DESCRIPTION OF THE INVENTION

Figure 1:
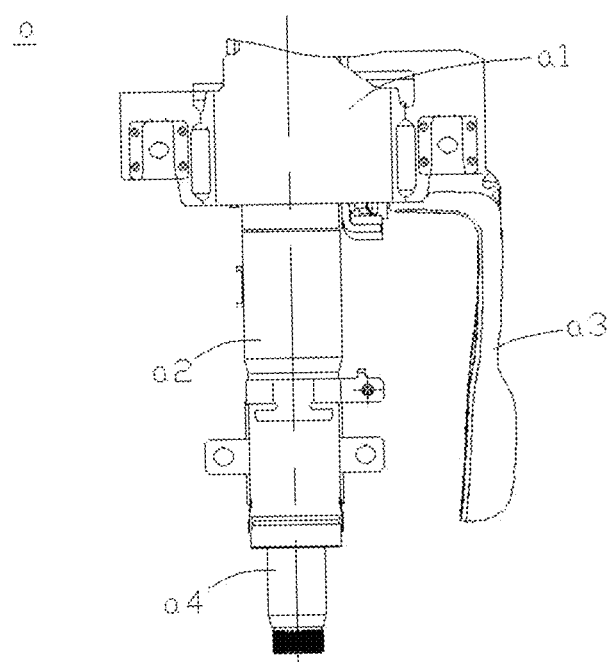
FIG. 1 is a structural view of the steering wheel adjusting device a of the Japan Nissan automobile.

The preferred embodiment of the present invention is mainly for the steering wheel adjusting device a of the Japan Nissan automobile (as shown in FIG. 1).

Figure 2:
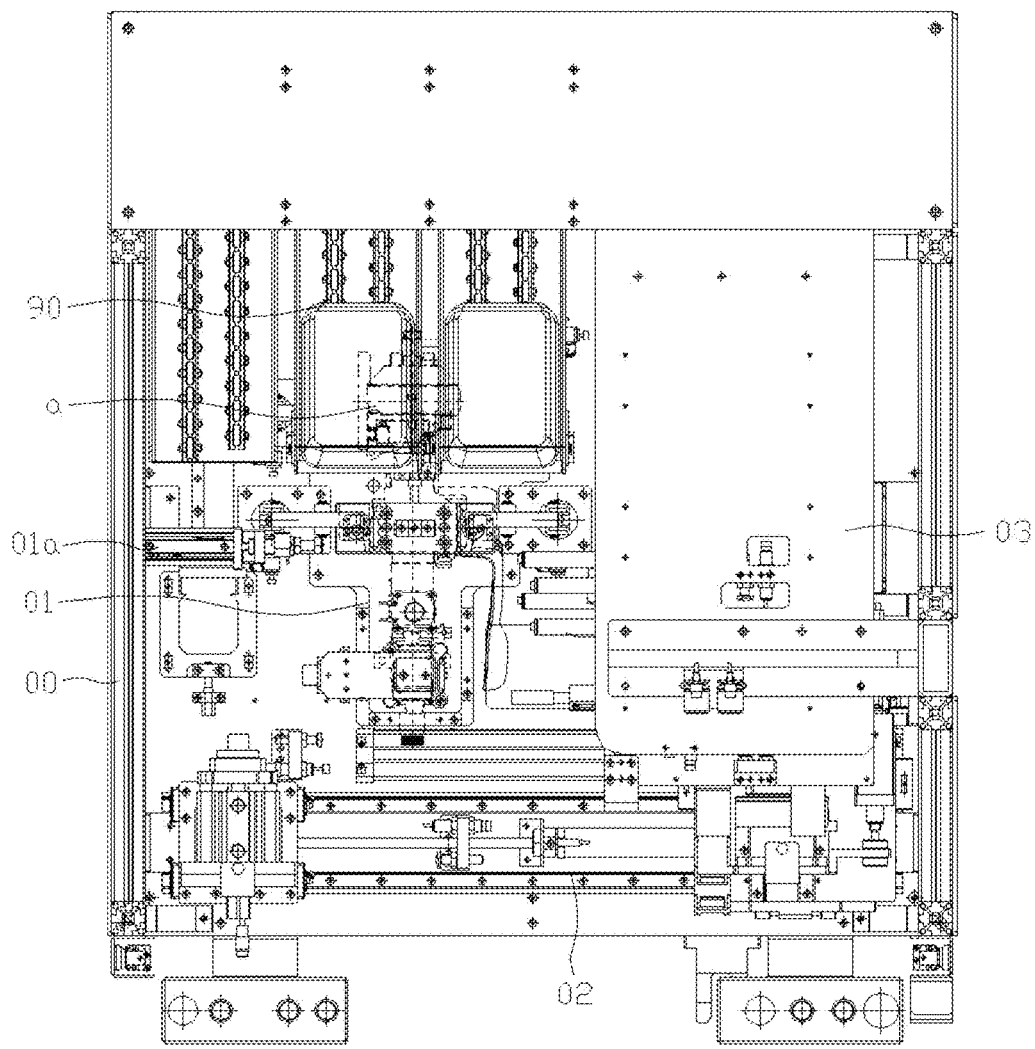
FIG. 2 is a structural view of the present invention of a dynamometer for Automobile steering wheel position adjusting device.

As shown in FIG. 2, a dynamometer for automobile steering wheel position adjusting device which comprising: a rack box 00, a fixing fixture 01, a supplemental fixing fixture 01a, a first dynamometer mechanism 02, a second dynamometer mechanism 03, and a parts transporting mechanism 90.

Figure 3:
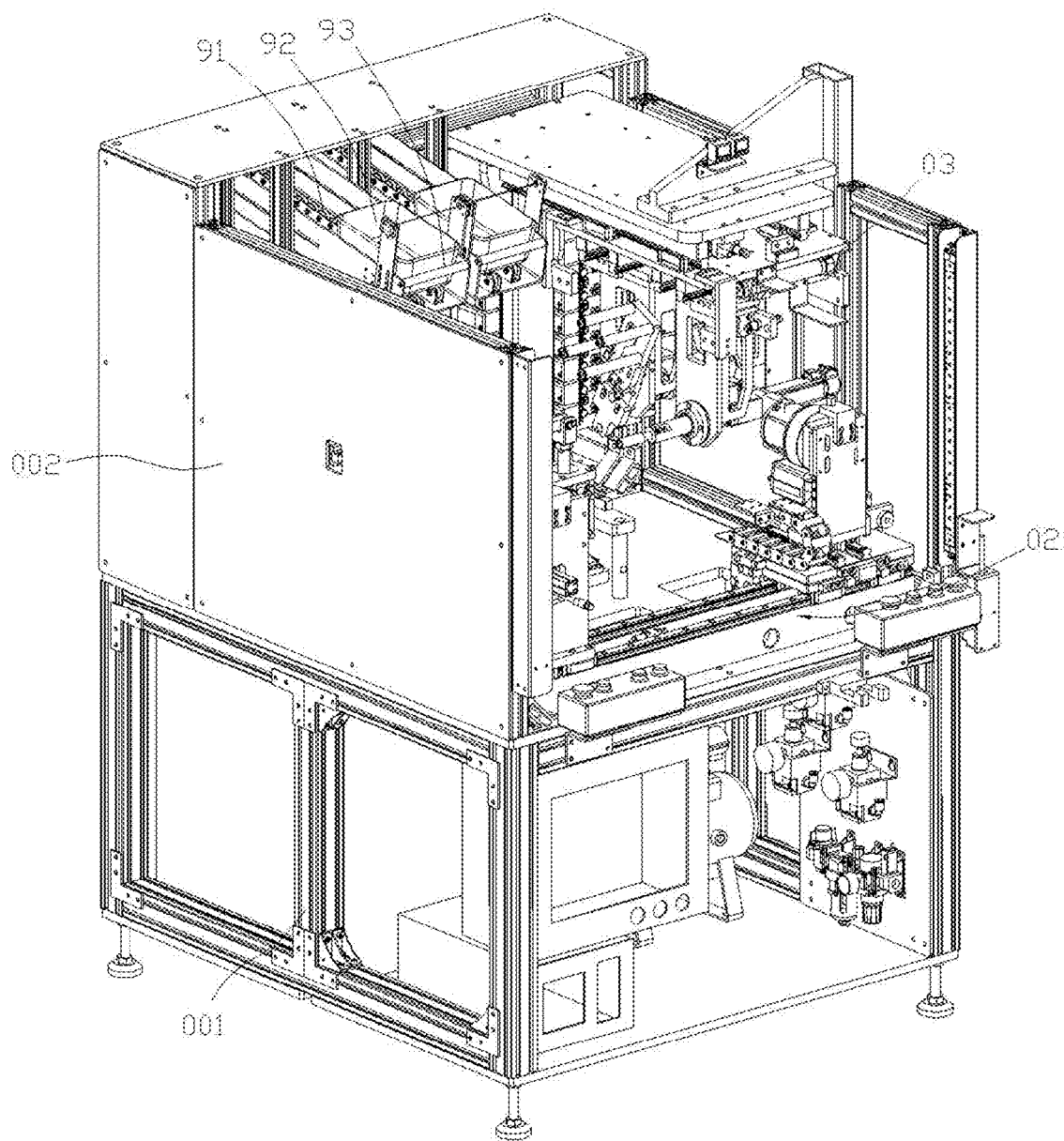
FIG. 3 is a perspective structural view of the dynamometer for Automobile steering wheel position adjusting device in FIG. 2.

As shown in FIG. 3, the rack box 00 which comprising a chassis 001 and a box body 002, and the box body 002 is mounted on top of the chassis.

Figure 7:
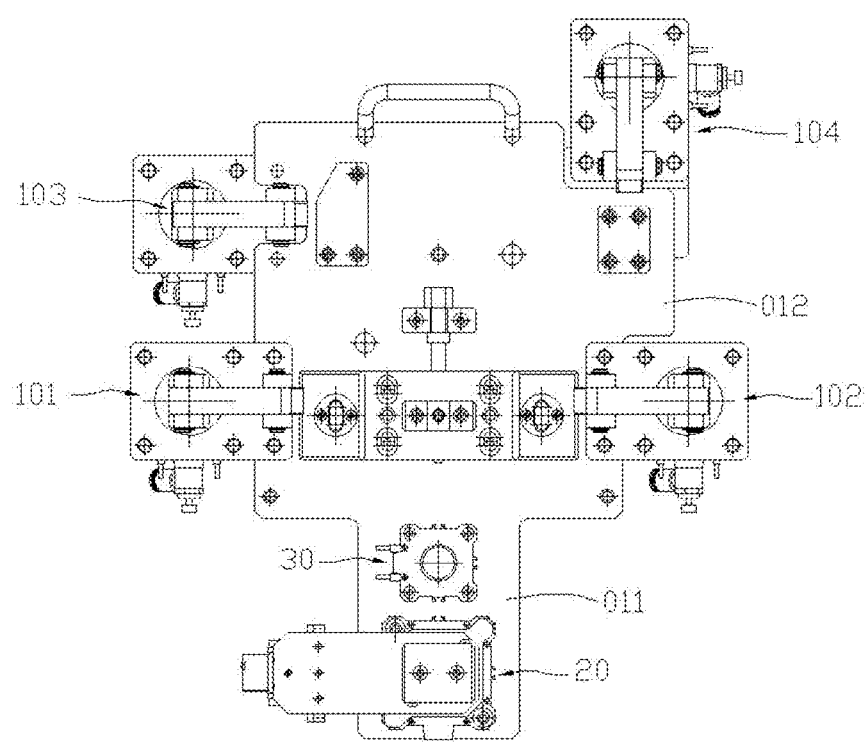
FIG. 7 is a structural view of the fixing fixture 01 in FIG. 6.
Figure 8:
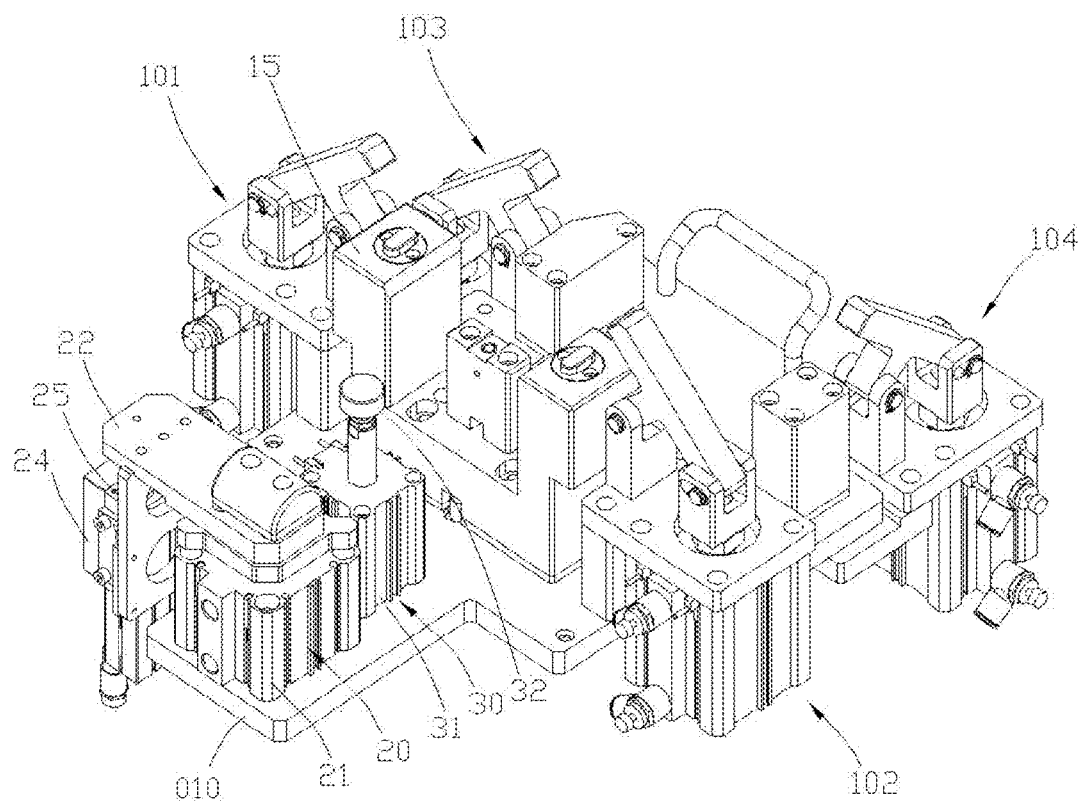
FIG. 8 is a perspective structural view of the fixing fixture 01 in FIG. 6.

In combination of FIG. 7 and FIG. 8, the fixing fixture 01 which comprising a base panel 010, a first locking device 101, a second locking device 102, a third locking device 103, a fourth locking device 104, a first supporting device 20 and a second supporting device 30.

Figure 9:
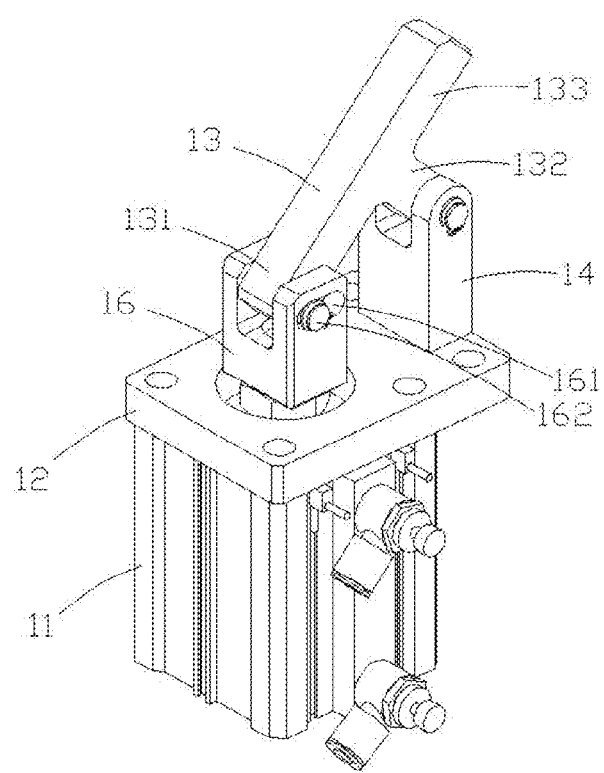
FIG. 9 is a perspective structural of the first locking device 101 or the second locking device 102 or the third locking device 103 or the fourth locking device 104.

In the above described fixing fixture 01, in combination of FIG. 7-FIG. 9, the first locking device 101, the second locking device 102, the third locking device 103 and the fourth locking device 104 are mounted on the base panel, the first locking device 101, the second locking device 102, the third locking device and the fourth locking device which all comprising a linear lifting cylinder 11, a fixing plate 12, a locking piece 13, a supporting piece 14 and a supporting platform 15; the linear lifting cylinder is mounted on the fixing plate and the fixing plate is levelly arranged, the fixing piece is vertically mounted on the fixing plate, the locking piece is in a T shape, the T shaped locking piece which comprising a rear branch 131, a middle branch 132 and a front branch 133, the rear branch is hinged to a piston rod of the linear lifting cylinder, the middle branch is hinged to the tip of the supporting piece, and the supporting platform is mounted on the base panel and below the front branch. Wherein, the rear branch 131 of the locking piece 13 is hinged to the piston rod of the linear lifting cylinder 11 by the lifting piece 16, the base of the lifting piece is fix mounted on the piston rod of the linear lifting cylinder, the top portion of the lifting piece is provided with a sliding slot 161, a sliding rod 162 is interposed in the sliding slot, and the sliding rod is hinged to the rear branch of the locking piece.

In the above described fixing fixture 01, in combination of FIG. 7 and FIG. 8, the first supporting deice 20 which comprising a first lifting cylinder 21 and a supporting plate 22, the first lifting cylinder is mounted on the base panel, the first supporting plate is mounted on a piston rod of the first lifting cylinder, and the supporting plate is levelly arranged. As shown in FIG. 8, the first supporting deice 20 which further comprising a stroke readable cylinder 24, the stroke readable cylinder is mounted on a vertical plate 25, the vertical plate is fix mounted on a small rectangular panel 011 of the base panel 010, a piston rod of the stroke readable cylinder is connected with the supporting plate 22 by a floating connecting head, and the piston rod of the stroke readable cylinder and the piston rod of the first lifting cylinder are respective connected to the left and right side of the supporting plate.

In the above described fixing fixture 01, in combination of FIG. 7 and FIG. 8, the second supporting device 30 which comprising a second lifting cylinder 31 and a supporting piece 32, the second lifting cylinder is mounted on the base panel 010 and the supporting piece 32 is mounted a piston rod of the second lifting cylinder 31.

In the above described fixing fixture 01, in combination of FIG. 7 and FIG. 8, the base panel 010 is in a convex shape, the convex shaped base panel 010 which comprising a small rectangular panel 011 and a large rectangular panel 012; the first supporting device 20 and the second supporting device are mounted on the small rectangular panel, the first supporting device is arranged directly in front of the second supporting device; the first locking device 101 and the second locking device 102 are respectively and symmetrically arranged at left and right side of the large rectangular panel, the front branch of the locking piece in the first locking device 101 and the front branch of the locking piece in the second locking device 102 are arranged opposite to each other; the third locking device 103 and the fourth locking device 104 are respectively arranged at the left and right side of the large rectangular panel, behind the first and the second locking device 102, the locking piece in the third and the fourth locking device are perpendicular to each other.

Figure 4:
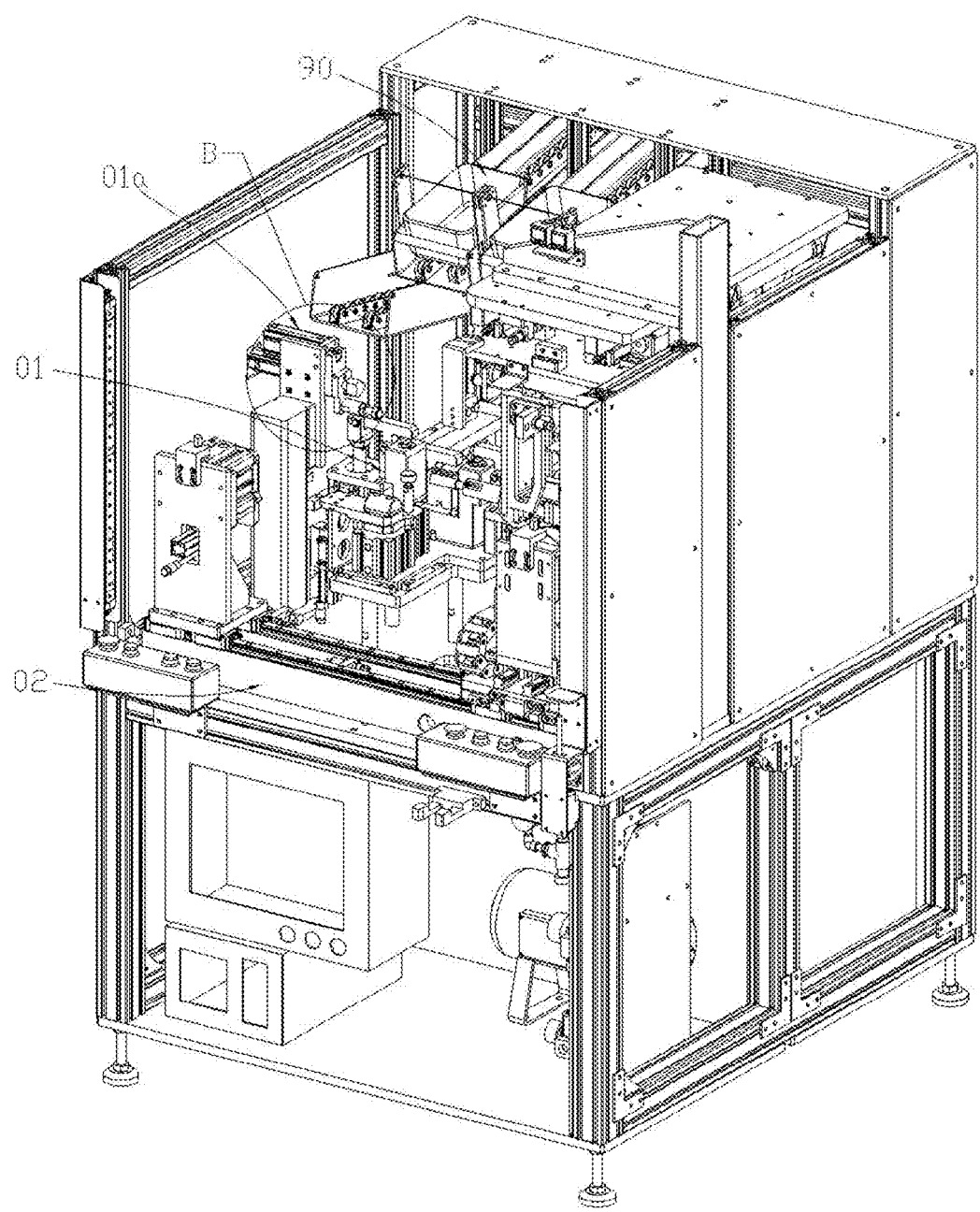
FIG. 4 is another structural view of the dynamometer for Automobile steering wheel position adjusting device in FIG. 2.
Figure 5:
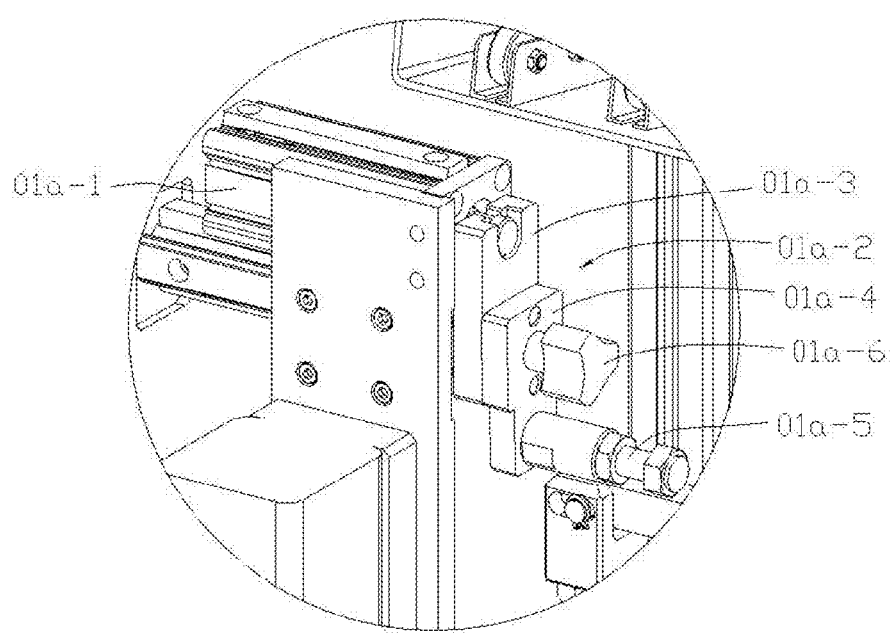
FIG. 5 is an enlarge view of the section B in FIG. 4.
Figure 6:
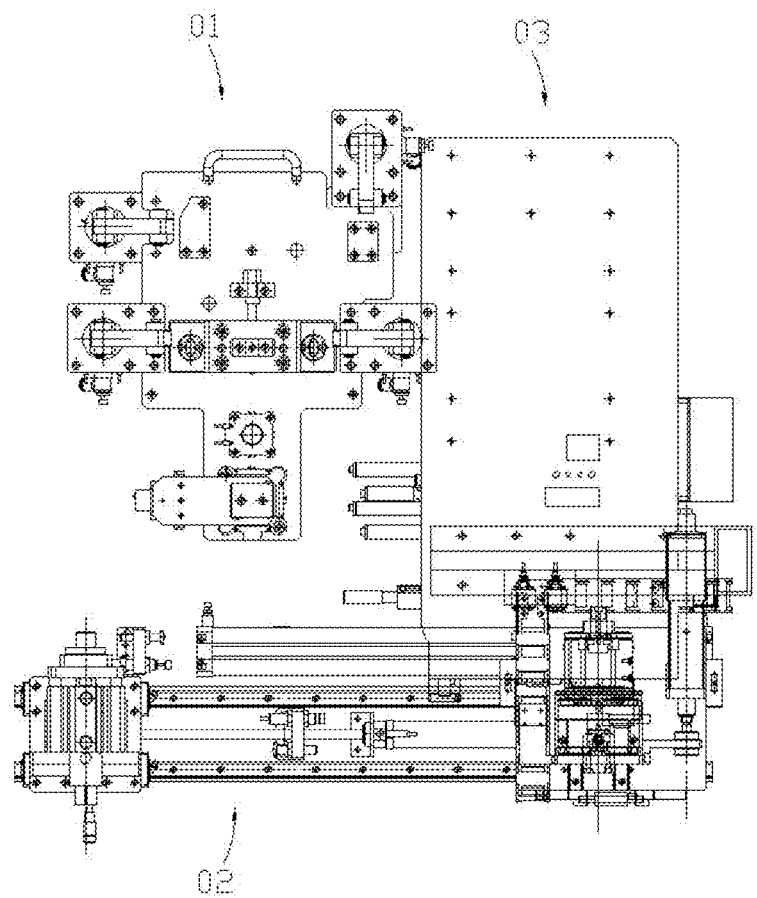
FIG. 6 is a structural view of the fixing fixture 01, the first dynamometer mechanism 02 and the second dynamometer mechanism 03.

In combination of FIG. 4 and FIG. 5, the supplemental fixing fixture 01a which comprising a levelly arranged linear cylinder 01a-1 and a positioning assembly 01a-2 mounted on the linear cylinder. Wherein, the positioning assembly 01a-2 which comprising a connecting piece 01a-3, a moving piece 01a-4, a positioning push head 01a-5 and a threaded fastening piece 01a-6; the connecting piece is fix mounted on a piston rod of the linear cylinder 01a-1, the moving piece is mounted on the connecting piece through the threaded fastening piece, the threaded fastening piece is provided with a rotating handle, the positioning head is fix mounted on the moving piece; the positioning push head is in cylindrical shape, the connecting piece and moving piece are in plate-like shape, the positioning push head and the moving piece are perpendicular to each other, and the positioning push head and the connecting are perpendicular to each other.

Figure 14:
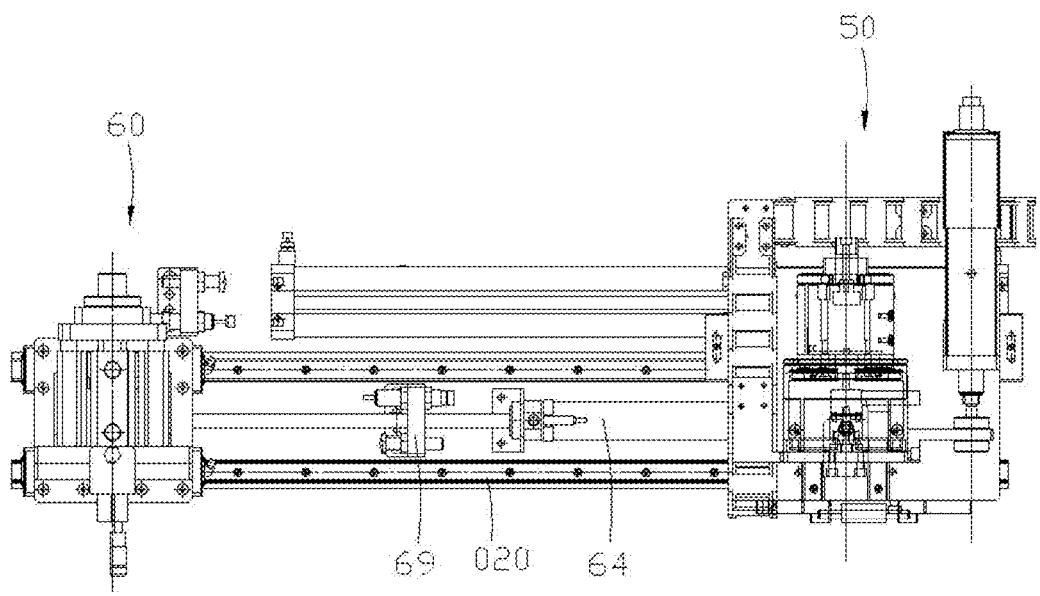
FIG. 14 is a structural view of the first dynamometer mechanism in FIG. 6.
Figure 15:
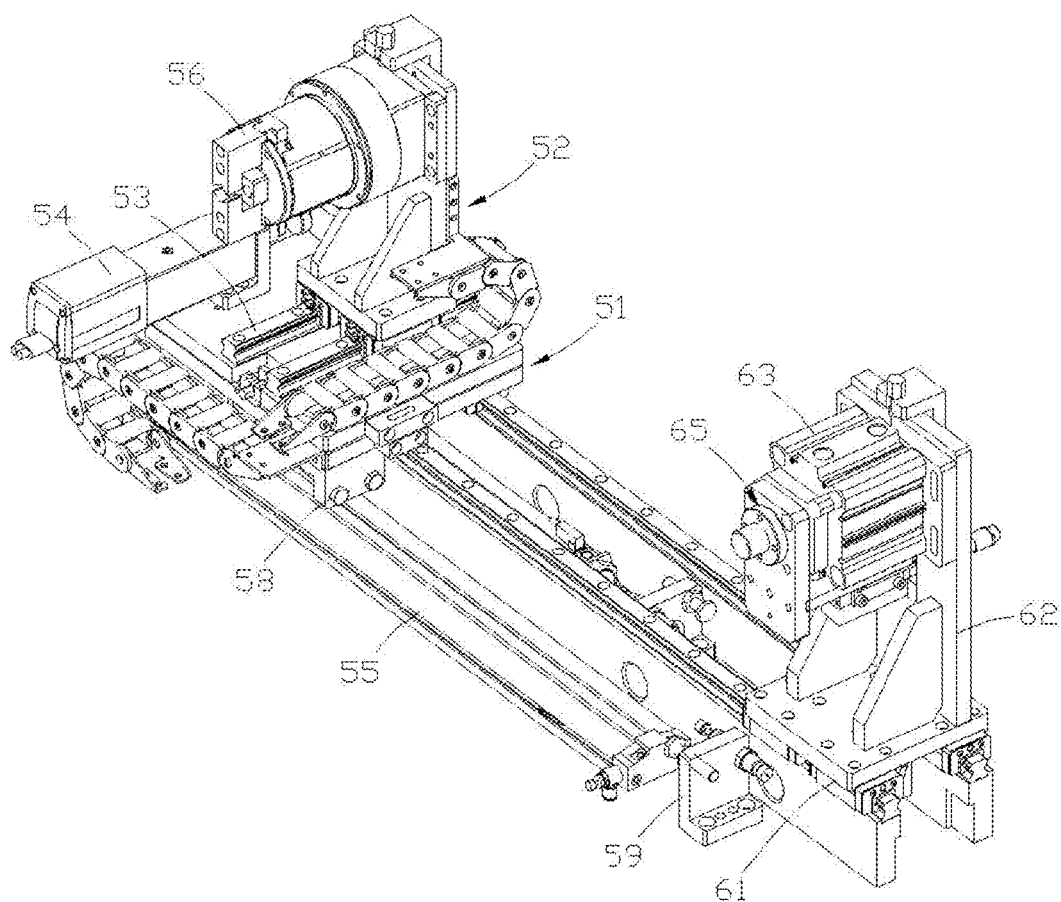
FIG. 15 is a perspective structural view of the first dynamometer mechanism in FIG. 6.

In combination of FIG. 14 and FIG. 15, the first dynamometer mechanism 02 which comprising a longitudinal rail 020, a dynamometer 50 and a positioning device 60.

In the above described dynamometer mechanism 02, in combination of FIG. 14 and FIG. 15, the dynamometer 50 which comprising a first sliding panel 51, a first supporting frame, a transverse rail 53, a transverse driving element 54, a first longitudinal driving element 55, a gripper 51 and a pressure sensor; the first sliding panel 51 is slidably mounted on the longitudinal rail, the first longitudinal element drives the first sliding panel 51 to slide on the longitudinal rail, the transverse rail is mounted on the first sliding panel 51, the first supporting frame is slidably mounted on the transverse rail, the transverse driving element drives the first supporting frame to slide on the transverse rail, the gripper is mounted on the first supporting frame and the pressure sensor is embedded in between the gripper and the first supporting frame.

In the above described first dynamometer mechanism 02, in combination of FIG. 14 and FIG. 15, the positioning device 60 which comprising a second sliding panel 61, a second supporting frame 62, a transverse cylinder 63, a second longitudinal driving element 64, and a positioning head 65; the second sliding panel is slidably mounted on the longitudinal rail, the second longitudinal driving element 64 drives the second sliding panel to slide on the longitudinal rail, the second supporting frame is fix mounted on the second sliding panel, the transverse cylinder is fix mounted on the second supporting frame and the positioning head is mounted on a piston head of the transverse cylinder.

In the above described first dynamometer mechanism 02, in combination of FIG. 14 and FIG. 15, the dynamometer and the positioning device are slidably mounted on two sides of the longitudinal rail 020; the gripper 56 in the dynamometer and the positioning head 65 in the positioning device are arranged at a same side of the longitudinal rail.

In the above described first dynamometer mechanism 02, in combination of FIG. 14 and FIG. 15, the first supporting frame 52 is provided with a first stopper bolt 58, near the outer side of the longitudinal rail is provided with a first stopper piece 59 which couples with the first stopper bolt, the first stopper bolt is provided with a first cushioning piece; the second supporting frame 62 is provided with a second stopper bolt, the inner side of the longitudinal rail is provided with a second stopper piece 69 which couples with the second stopper bolt 69, and the second stopper piece is provided with a second cushioning piece.

In the above described first dynamometer mechanism 02, in combination of FIG. 14 and FIG. 15, the transverse driving element 54 is an electrical cylinder, the transverse driving element is fix mounted on the first sliding panel 51, a piston rod of the transverse driving element is fix connected with the first supporting frame 52; the first longitudinal driving element 55 is an electrical cylinder, the first longitudinal driving element 55 is fix mounted on the outer side of the longitudinal rail 020, the sliding piece of the first longitudinal driving element 55 is fix connected with the first sliding panel 51; the second longitudinal driving element 64 is an air cylinder, the second longitudinal driving element 64 is mounted on the inner side of the longitudinal rail, and a piston rod of the second longitudinal driving element 64 is fix connected with the second sliding panel 61.

Figure 13:
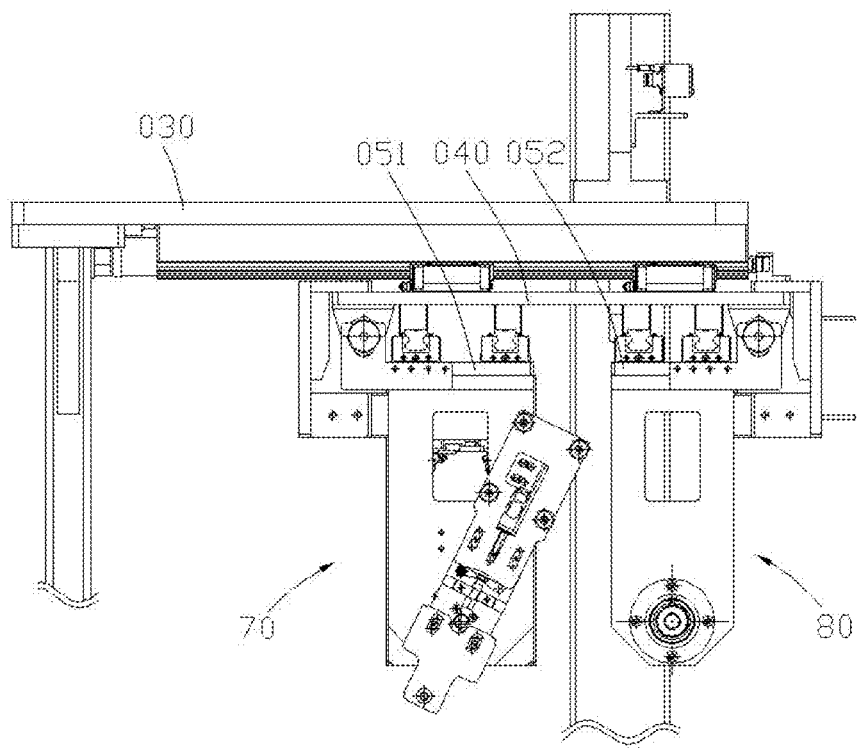
FIG. 13 is a left bottom view of the structural view of the second dynamometer mechanism 03 in FIG. 10.

As shown in FIG. 13, the second dynamometer mechanism 03 which comprising a chassis apical plate 030, a longitudinal flat panel 040, a first transverse flat panel 051, a second transverse flat panel 052, a handle dynamometer device 70 and a handle tuning device 80.

In the above described second dynamometer mechanism 03, as shown in FIG. 13, the chassis apical plate 030 is levelly arranged in a fixed position; the longitudinal flat panel 040 is slidably mounted on bottom plane of the chassis apical plate 030, the longitudinal flat panel 040 is able to move in longitudinal direction in relation to the chassis apical plate; the first transverse flat panel 051 and the second transverse flat panel 052 are slidably mounted on the bottom plane of the longitudinal flat panel 040, the first transverse flat panel 051 and the second transverse flat panel 052 are arrange in juxtapose but independent to each other, the first transverse flat panel 051 is able to move in transverse direction in relation to the longitudinal flat panel 040, and the second transverse flat panel 052 is able to move in transverse direction in relation to the longitudinal flat panel 040; the handle dynamometer device 70 is mounted on the bottom plane of the first transverse flat panel 051, and the handle tuning device 80 is mounted on the bottom plane of the second transverse flat panel 052.

Figure 11:
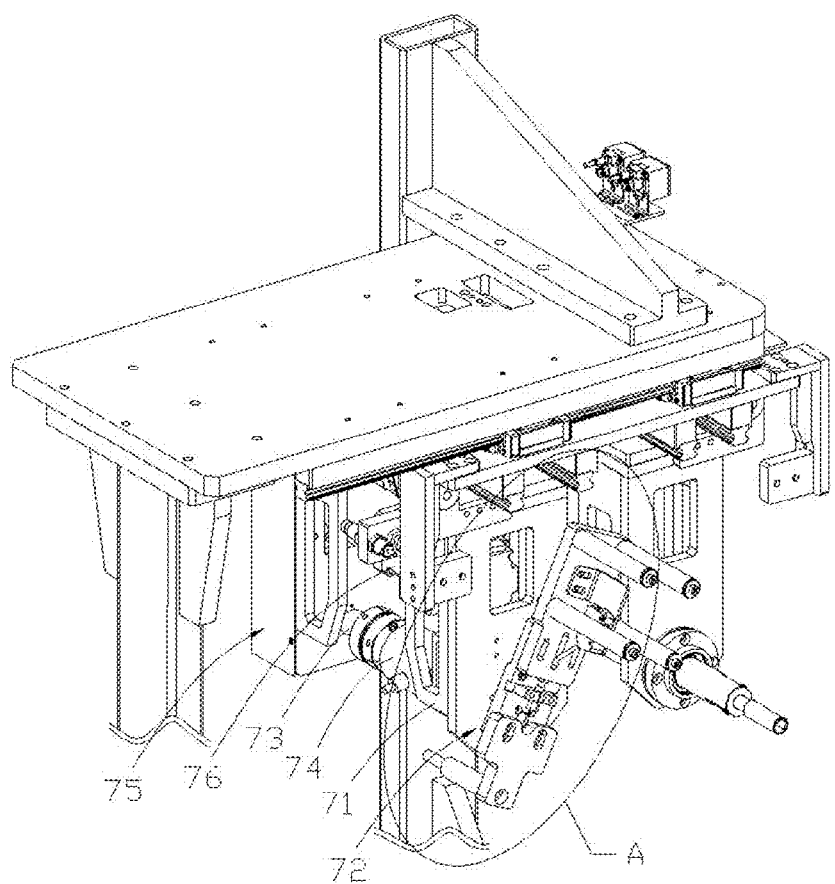
FIG. 11 is another perspective structural view of the second dynamometer 03 in FIG. 6.

In the above described second dynamometer mechanism 03, as shown in FIG. 11, the handle dynamometer 70 which comprising a third supporting frame 71, handle gripping adjustment device 72, a rotary shaft 73, a torque sensor 74, a transmission device and a servo motor 76; the third supporting frame is fix mounted on the first transverse flat panel 051, the rotary shaft 73 is hinged to the third supporting frame, the handle gripping adjustment deice is fix mounted on one end of the rotary shaft 73, the other end of the rotary shaft 73 is connected to the servo motor through the transmission device, the torque sensor is mounted on the rotary shaft 73; and the axis of the rotary shaft 73 is arranged transversely.

Figure 12:
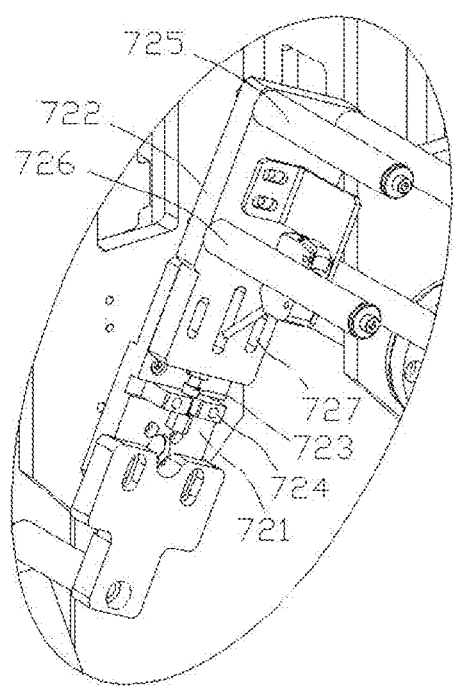
FIG. 12 is an enlarge view of section A in FIG. 11.

In the above described second dynamometer mechanism 03, as shown in FIG. 12, the handle gripping adjustment device 72 which comprising a first connecting panel 721, a second connecting panel 722, a fixing bolt, an adjusting bolt 723, a fixing piece 724, a first set cylindrical handles 725 and a second set cylindrical handles 726; the first connecting panel is fix mounted on the rotary shaft 73, the second connecting panel is provided with a long through hole 727, the fixing bolt is interposed in the long through hole and bolted to the first connecting panel, the first connecting panel is provided with a slot, the fixing piece is fixed in the slot, the adjusting bolt is hinged to the fixing piece, the threaded portion of the adjusting bolt is bolted to the end surface of the second connecting panel, the length of the adjusting bolt equals to the length of the long through hole; the first set cylindrical handles and the second set cylindrical handles both which comprising a pair of parallel cylindrical handles, the first set cylindrical handles and the second set cylindrical handles are vertically fix mounted on the second connecting panel where the first set cylindrical handles is arranged in front of the second set cylinder handles on the second connecting panel, the centerline of any cylindrical handle of the first or second set cylindrical handles is perpendicular to the axis of the rotary shaft 73.

Figure 10:
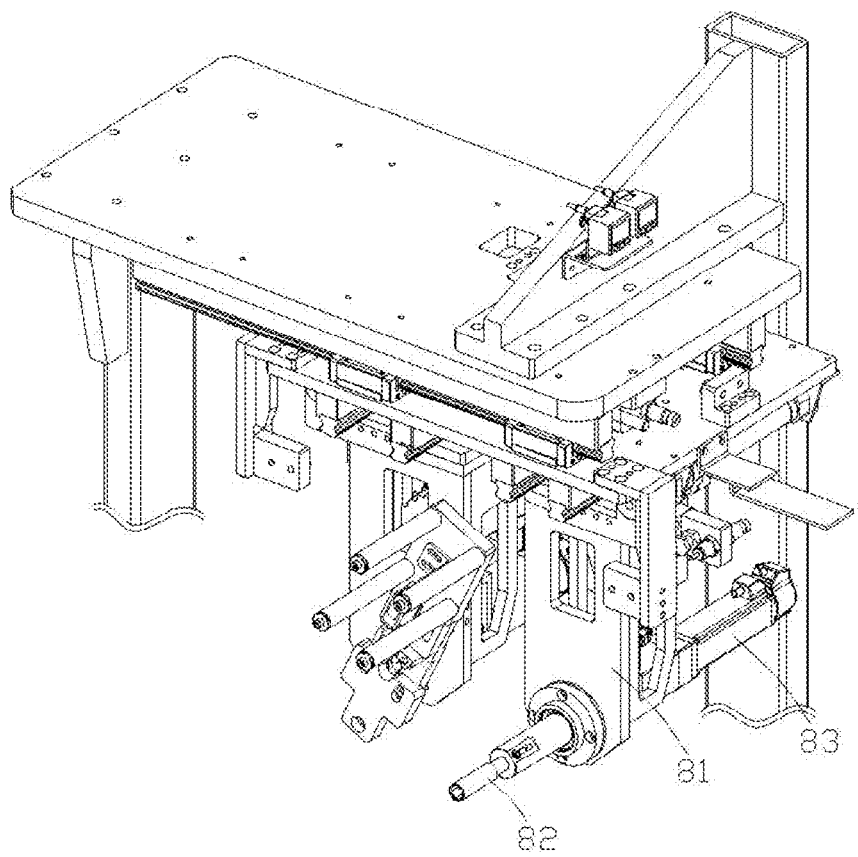
FIG. 10 is a perspective structural view of the second dynamometer 03 in FIG. 6.

In the above described second dynamometer mechanism 03, as shown in FIG. 10, the handle tuning device 80 which comprising a fourth supporting frame 81, a sleeve 82 and a servo tightening axis 83; the fourth supporting frame is fix mounted on the second transverse flat panel 052, the sleeve 82 is hinged to the fourth supporting frame, the back end of the sleeve 82 is hinged to the servo tightening axis; and the sleeve 82 is arranged transversely.

In combination of FIG. 3 and FIG. 4, the parts transporting mechanism is mounted on the rear side wall of the box body 002, the parts transporting mechanism is located above of the fixing fixture 01; the parts transporting mechanism which comprising a roller conveyor track 91 and a parts box 92, the roller conveyor track runs through the rear side wall of the box body 002 and tilts toward the box body 002, one end of the roller conveyor track, inside the box body 002, is provided with a limiting rod 93, and the parts box slides on the roller conveyor track.

In combination of FIG. 2-FIG. 4, the fixing fixture 01 and the first dynamometer mechanism 02 are mounted on the base of the box body 002, the first dynamometer is located in front of the fixing fixture, the supplementary fixing fixture 01a is mounted on the right inner side wall of the box body 002, and the second dynamometer mechanism 03 is mounted on the left inner side wall of the box body 002.

During actual operation, the present invention of dynamometer for automobile steering wheel position adjusting device operates as the following:

First, before testing the steering wheel position adjusting device a, the steering wheel position adjusting device a is placed on the fixing fixture 01, more specifically, the steering wheel position adjusting device is placed on the four locking devices of the supporting platform 15, the supporting panel 22 of the first supporting device, and the supporting piece 32 of the second supporting device; wherein, the four locking devices of the supporting platform 15 support the main body a1 of the steering wheel position adjusting device, and the supporting panel 22 and the supporting piece 32 support the neck a2 of the steering wheel position adjusting device.

Second, the linear lifting cylinder 11 in the four locking devices extends, the linear lifting cylinder 11 lifts the rear branch 131 of the locking piece 13, the locking piece 13 pivots around the middle branch 132 and turns in a certain degree of angle with the hinge joint of the supporting piece 14, the front branch 133 of the locking piece presses down on the portion of the steering wheel position adjusting device a that rests on the supporting platform 15; and At this time, the main body a1 of the steering wheel position adjusting device is secured.

Third, the linear cylinder 01a-1 in the supplementary fixing fixture 01a extends and drives the positioning assembly 01a-2 to push against the side wall of the main body a1 of the steering wheel position adjusting device a to further secure the steering wheel position adjusting device a.

Fourth, the second lifting cylinder 31 in the second supporting device 30 extends and drives the supporting piece to move upward and push against the bottom of the neck a2 of the steering wheel position adjusting device a to further secure the steering wheel position adjusting device a.

Fifth, in the second dynamometer mechanism 03, the rotating centerline of the adjusting handle a3 is parallel to the axis of the rotary shaft 73 in the handle dynamometer device 70. The longitudinal flat panel 040 moves in a longitudinal direct in relation to the chassis apical plate 030, the longitudinal flat panel 040 drives the handle dynamometer device 70 to move longitudinally, which moves the gripping adjustment device 72 to the side of the adjustment handle a3, afterward, the first transverse flat panel 051 moves transversely in relation to the longitudinal flat panel 040, the first transverse flat panel 051 drives the handle dynamometer device 70 to move transversely, which causes the gripping adjustment device 72 in the handle dynamometer device 70 to grip on the adjustment handle a3 in the steering wheel position adjusting device, the servo motor 76 through the transmission device to turn the rotary shaft 73, the rotary shaft 73 drives the gripping adjustment device 72 to turn the adjustment handle a3, during the turning of the adjustment handle a3, and the torque sensor 74 mounted on the rotary shaft 73 senses the required torque to turn the adjustment handle a3. If the torque required to turn the adjustment handle a3 does not match the predetermined value, then the adjustment handle a3 is released from the gripping adjustment device 72, and after the longitudinal flat panel 040 is moved longitudinally above the chassis apical plate 030 and the second transverse flat panel 052 is moved transversely above the longitudinal flat panel 040, the sleeve 82 in the handle tuning device 80 sleeves the adjusting bolt, the servo tightening axis 83 drives the sleeve 82 to turn clockwise or counter clockwise in a certain angle to adjust the tightness of the adjusting bolt and to adjust the torque required to turn the adjustment handle a3. Afterward, the sleeve 82 is released from the adjusting bolt, the longitudinal flat panel 040 is moved longitudinally above the chassis apical plate 030 and the first transverse flat panel 051 is moved transversely above the longitudinal flat panel 040, the gripping adjustment device 72 in the handle dynamometer device 70 again, gripping on the adjustment handle a3 and testing the torque figure, if the torque figure still not matching the predetermined value, the sleeve 82 in the handle tuning device 80 again, adjusting the tightness of the adjusting bolt on the adjustment handle a3.

Sixth, in the first dynamometer mechanism 02, the second longitudinal driving element 64 drives the second supporting frame 62 in the positioning device 60 to move on the longitudinal track 020 to a predetermined working station, afterward, the transverse cylinder 63 drives the positioning head 65 to move transversely in a predetermined distance, the positioning head 65 pushes against the top of the telescoping column a4 causing the telescoping column a4 to retract a certain distance within the neck a2 to allow the griper 56 to precisely grip the top of the telescoping column a4 during operation; afterward, the transverse cylinder 63 and the second longitudinal driving element 64 drive the positioning head 65 to return to the original position; afterward, the first longitudinal driving element 55 drives the first supporting frame 52 in the dynamometer 50 to move on the longitudinal track 020 to near the top of the telescoping column a4, the transverse driving element 54 drives the first supporting frame 52 to move transversely, and causing the griper 56 to move and grip the top of the telescoping column a4. Afterward, driving by the transverse driving element 54, the griper 56 to pull or push the telescoping column a4, the griper 56 sends the pull or push pressure to the pressure sensor in the dynamometer 50, and the pressure sensor shows the reading in a display, as such the operator is able to know the required force to pull or push the telescoping column a4 within the neck a2 and to make appropriate adjustment.

Although the invention has been explained in relation to its preferred embodiment, it is to be understood that many other possible modifications and variations can be made without departing from the spirit and scope of the invention as hereinafter claimed.

The invention claimed is:

1. A dynamometer for an automobile steering wheel position adjusting device, comprising:
   a rack box,
   a fixing fixture,
   a supplemental fixing fixture,
   a first dynamometer mechanism, and
   a second dynamometer mechanism;
   wherein the rack box comprises a chassis and a box body, and the box body is mounted on top of the chassis;
   wherein the fixing fixture comprises a base panel, a first locking device, a second locking device, a third locking device, a fourth locking device, a first supporting device and a second supporting device;
   wherein the supplemental fixing fixture comprises a levelly arranged linear cylinder and a positioning assembly mounted on the linear cylinder;
   wherein the first dynamometer mechanism comprises a longitudinal rail, a dynamometer and a positioning device;
   wherein the second dynamometer mechanism comprises a chassis apical plate, a longitudinal flat panel, a first transverse flat panel, a second transverse flat panel, a handle dynamometer device and a handle tuning device;
   wherein:
   the first locking device, the second locking device, the third locking device and the fourth locking device are mounted on the base panel,
   the first locking device, the second locking device, the third locking device and the fourth locking device all comprise a linear lifting cylinder, a fixing plate, a locking piece, a supporting piece and a supporting platform;

each linear lifting cylinder is respectively mounted on each fixing plate and each fixing plate is levelly arranged, each supporting piece is respectively vertically mounted on each fixing plate, each locking piece has a T shape, each locking piece comprising a rear branch, a middle branch and a front branch, each rear branch is respectively hinged to a piston rod of each linear lifting cylinder, each middle branch is respectively hinged to the tip of each supporting piece, and each supporting platform is mounted on the base panel and respectively below each front branch;

wherein the first supporting device comprises a first lifting cylinder and a supporting plate, the first lifting cylinder is mounted on the base panel, the supporting plate is mounted on a piston rod of the first lifting cylinder, and the supporting plate is levelly arranged;

wherein the second supporting device comprises a second lifting cylinder and a supporting piece, the second lifting cylinder is mounted on the base panel and the supporting piece is mounted a piston rod of the second lifting cylinder;

wherein the base panel is in a convex shape, the base panel comprises a small rectangular panel and a large rectangular panel;

the first supporting device and the second supporting device are mounted on the small rectangular panel, the first supporting device is arranged directly in front of the second supporting device;

the first locking device and the second locking device are respectively and symmetrically arranged at left and right sides of the large rectangular panel, the front branch of the locking piece in the first locking device and the front branch of the locking piece in the second locking device are arranged opposite to each other;

the third locking device and the fourth locking device are respectively arranged at the left and right sides of the large rectangular panel, behind the first and the second locking device, the locking piece in the third locking device and the locking piece in the fourth locking device are perpendicular to each other;

wherein the dynamometer comprises a first sliding panel, a first supporting frame, a transverse rail, a transverse driving element, a first longitudinal driving element, a gripper and a pressure sensor;

the first sliding panel is slidably mounted on the longitudinal rail, the first longitudinal driving element drives the first sliding panel to slide on the longitudinal rail, the transverse rail is mounted on the first sliding panel, the first supporting frame is slidably mounted on the transverse rail, the transverse driving element drives the first supporting frame to slide on the transverse rail, the gripper is mounted on the first supporting frame and the pressure sensor is embedded in between the gripper and the first supporting frame;

wherein the positioning device comprises a second sliding panel, a second supporting frame, a transverse cylinder, a second longitudinal driving element, and a positioning head;

the second sliding panel is slidably mounted on the longitudinal rail, the second longitudinal driving element drives the second sliding panel to slide on the longitudinal rail, the second supporting frame is fix mounted on the second sliding panel, the transverse cylinder is fix mounted on the second supporting frame and the positioning head is mounted on a piston head of the transverse cylinder;

wherein the dynamometer and the positioning device are slidably mounted on two sides of the longitudinal rail;

the gripper in the dynamometer and the positioning head in the positioning device are arranged at a same side of the longitudinal rail;

wherein the chassis apical plate is levelly arranged in a fixed position;

the longitudinal flat panel is slidably mounted on bottom plane of the chassis apical plate, the longitudinal flat panel is able to move in a longitudinal direction in relation to the chassis apical plate;

the first transverse flat panel and the second transverse flat panel are slidably mounted on the bottom plane of the longitudinal flat panel, the first transverse flat panel and the second transverse flat panel are arranged in juxtaposition but independent from each other, the first transverse flat panel is able to move in a transverse direction in relation to the longitudinal flat panel, and the second transverse flat panel is able to move in the transverse direction in relation to the longitudinal flat panel;

the handle dynamometer device is mounted on the bottom plane of the first transverse flat panel, and the handle tuning device is mounted on the bottom plane of the second transverse flat panel;

wherein the handle dynamometer comprises a third supporting frame, handle gripping adjustment device, a rotary shaft, a torque sensor, a transmission device and a servo motor;

the third supporting frame is fix mounted on the first transverse flat panel, the rotary shaft is hinged to the third supporting frame, the handle gripping adjustment device is fix mounted on one end of the rotary shaft, the other end of the rotary shaft is connected to the servo motor through the transmission device, the torque sensor is mounted on the rotary shaft; and the axis of the rotary shaft is arranged transversely;

wherein the handle tuning device comprises a fourth supporting frame, a sleeve and a servo tightening axis;

the fourth supporting frame is fix mounted on the second transverse flat panel, the sleeve is hinged to the fourth supporting frame, the back end of the sleeve is hinged to the servo tightening axis; and the sleeve is arranged transversely; and wherein the fixing fixture and the first dynamometer mechanism are mounted on the base of the box body, the first dynamometer is located in front of the fixing fixture, the supplementary fixing fixture is mounted on a right inner side wall of the box body, and the second dynamometer mechanism is mounted on a left inner side wall of the box body.

2. The dynamometer for automobile steering wheel position adjusting device as claimed in claim 1, wherein a parts transporting mechanism is mounted on a rear side wall of the box body, the parts transporting mechanism is located above of the fixing fixture;

the parts transporting mechanism comprises a roller conveyor track and a parts box, wherein the roller conveyor track runs through the rear side wall of the box body and tilts toward the box body, wherein one end of the roller conveyor track, inside the box body, is provided with a limiting rod, and the parts box slides on the roller conveyor track.

3. The dynamometer for automobile steering wheel position adjusting device as claimed in claim 1, wherein the rear branch of each locking piece is respectively hinged to the piston rod of each linear lifting cylinder by a respective lifting piece, the base of each respective lifting piece is respectively fix mounted on the piston rod of each linear lifting cylinder, the top portion of each respective lifting piece is provided with a respective sliding slot, a respective sliding rod is interposed in each respective sliding slot, and each respective sliding rod is respectively hinged to the rear branch of each locking piece.

4. The dynamometer for automobile steering wheel position adjusting device as claimed in claim 1, wherein the first supporting device further comprises a stroke readable cylinder, the stroke readable cylinder is mounted on a vertical plate, the vertical plate is fix mounted on the small rectangular panel of the base panel, a piston rod of the stroke readable cylinder is connected with the supporting plate by a floating connecting head, and the piston rod of the stroke readable cylinder and the piston rod of the first lifting cylinder are respectively connected to the left and right side of the supporting plate.

5. The dynamometer for automobile steering wheel position adjusting device as claimed in claim 1, wherein the positioning assembly comprises a connecting piece, a moving piece, a positioning push head and a threaded fastening piece;

the connecting piece is fix mounted on a piston rod of the linear cylinder, the moving piece is mounted on the connecting piece through the threaded fastening piece, the threaded fastening piece is provided with a rotating handle, the positioning push head is fix mounted on the moving piece;

the positioning push head is in cylindrical shape, the connecting piece and moving piece are in plate-like shape, the positioning push head and the moving piece are perpendicular to each other, and the positioning push head and the connecting head are perpendicular to each other.

6. The dynamometer for automobile steering wheel position adjusting device as claimed in claim 1, wherein the first supporting frame is provided with a first stopper bolt, near the outer side of the longitudinal rail is provided with a first stopper piece which couples with the first stopper bolt, the first stopper bolt is provided with a first cushioning piece;

the second supporting frame is provided with a second stopper bolt, the inner side of the longitudinal rail is provided with a second stopper piece which couples with the second stopper bolt, and the second stopper piece is provided with a second cushioning piece.

7. The dynamometer for automobile steering wheel position adjusting device as claimed in claim 1, wherein the transverse driving element is an electrical cylinder, the transverse driving element is fix mounted on the first sliding panel, a piston rod of the transverse driving element is fix connected with the first supporting frame;

the first longitudinal driving element is an electrical cylinder, the first longitudinal driving element is fix mounted on the outer side of the longitudinal rail, a sliding piece of the first longitudinal driving element is fix connected with the first sliding panel;

the second longitudinal driving element is an air cylinder, the second longitudinal driving element is mounted on the inner side of the longitudinal rail, and a piston rod of the second longitudinal driving element is fix connected with the second sliding panel.

8. The dynamometer for automobile steering wheel position adjusting device as claimed in claim 1 wherein the handle gripping adjustment device comprises a first connecting panel, a second connecting panel, a fixing bolt, an adjusting bolt, a fixing piece, a first set of cylindrical handles and a second set of cylindrical handles;

the first connecting panel is fix mounted on the rotary shaft, the second connecting panel is provided with a long through hole, the fixing bolt is interposed in the long through hole and bolted to the first connecting panel, the first connecting panel is provided with a slot, the fixing piece is fixed in the slot, the adjusting bolt is hinged to the fixing piece, the threaded portion of the adjusting bolt is bolted to the end surface of the second connecting panel, the length of the adjusting bolt equals the length of the long through hole;

the first set of cylindrical handles and the second set of cylindrical handles both comprise a pair of parallel cylindrical handles, the first set of cylindrical handles and the second set of cylindrical handles are horizontally fix mounted on the second connecting panel where the first set of cylindrical handles is arranged in front of the second set of cylinder handles on the second connecting panel, the centerline of any cylindrical handle of the first or second set of cylindrical handles is parallel to the axis of the rotary shaft.

* * * * *